(12) United States Patent
Kurian

(10) Patent No.: US 11,102,197 B2
(45) Date of Patent: Aug. 24, 2021

(54) SECURITY TOOL

(71) Applicant: Bank of America Corporation, Charlotte, NC (US)

(72) Inventor: Manu Jacob Kurian, Dallas, TX (US)

(73) Assignee: Bank of America Corporation, Charlotte, NC (US)

(*) Notice: Subject to any disclaimer, the term of this patent is extended or adjusted under 35 U.S.C. 154(b) by 252 days.

(21) Appl. No.: 16/559,772

(22) Filed: Sep. 4, 2019

(65) Prior Publication Data
US 2021/0067501 A1    Mar. 4, 2021

(51) Int. Cl.
*H04L 29/06* (2006.01)
*H04L 9/06* (2006.01)

(52) U.S. Cl.
CPC .......... *H04L 63/083* (2013.01); *H04L 9/0637* (2013.01); *H04L 63/0892* (2013.01)

(58) Field of Classification Search
CPC . H04L 63/083; H04L 9/0637; H04L 63/0892; H04L 63/102; H04L 2209/38; H04L 9/3239; H04L 9/321
See application file for complete search history.

(56) References Cited

U.S. PATENT DOCUMENTS

| | | | |
|---|---|---|---|
| 4,511,946 A * | 4/1985 | McGahan | G07C 9/00722 340/5.24 |
| 5,535,276 A * | 7/1996 | Ganesan | H04L 9/0825 380/46 |
| 6,817,519 B2 * | 11/2004 | Yasushi | H04L 63/083 235/379 |
| 7,281,130 B2 | 10/2007 | Johnson et al. | |
| 7,478,418 B2 | 1/2009 | Supramaniam et al. | |
| 7,571,471 B2 | 8/2009 | Sandhu et al. | |
| 7,661,128 B2 | 2/2010 | Chen et al. | |
| 7,734,045 B2 | 6/2010 | Sandhu et al. | |
| 7,734,911 B2 | 6/2010 | Ganesan et al. | |
| 7,805,128 B2 | 9/2010 | Bentley et al. | |
| 7,908,645 B2 | 3/2011 | Varghese et al. | |
| 8,006,300 B2 | 8/2011 | Mizrah | |

(Continued)

OTHER PUBLICATIONS

Kurian, M. J., "Security Tool," U.S. Appl. No. 16/559,813, filed Sep. 4, 2019, 46 pages.

(Continued)

*Primary Examiner* — John B King
(74) *Attorney, Agent, or Firm* — Michael A. Springs

(57) ABSTRACT

A system includes a database and a processor. The database stores a key indicating that a user previously accessed a first subsystem. An authentication string stores a first part of the key and a first authentication server stores a second part. The processor receives a request from the user seeking access to a second subsystem. The processor launches a first virtual host to receive the authentication string and send it to the first authentication server, to extract the first part of the key, assemble a test key including the first and second parts of the key, and determine that the test key matches the key stored in the database. The first virtual host then launches a second virtual host to receive login credentials and send them to a second authentication server to authenticate the user. In response, the second virtual host provides the user with access to the second subsystem.

20 Claims, 6 Drawing Sheets

(56) References Cited

U.S. PATENT DOCUMENTS

| | | |
|---|---|---|
| 8,041,954 B2 | 10/2011 | Plesman |
| 8,266,674 B2 | 9/2012 | Huang et al. |
| 8,341,406 B2 | 12/2012 | Hildebrand |
| 8,595,810 B1 | 11/2013 | Ben Ayed |
| 8,769,304 B2 | 7/2014 | Kirsch |
| 8,769,655 B2 | 7/2014 | Gould et al. |
| 8,874,547 B2 * | 10/2014 | Khanolkar ........ G06F 16/24542 707/718 |
| 8,953,786 B2 * | 2/2015 | Ramaswamy ............ H04L 9/14 380/28 |
| 9,064,257 B2 | 6/2015 | Beigi |
| 9,231,948 B1 * | 1/2016 | Gabrielson ............ H04L 63/18 |
| 9,311,472 B2 | 4/2016 | Nguyen et al. |
| 9,402,181 B1 | 7/2016 | Yi et al. |
| 9,432,361 B2 | 8/2016 | Mahaffey et al. |
| 9,444,809 B2 | 9/2016 | Ganesan |
| 9,455,988 B2 | 9/2016 | Oberheide et al. |
| 9,473,485 B2 | 10/2016 | Kendall |
| 9,529,992 B2 | 12/2016 | Hillis |
| 9,763,097 B2 | 9/2017 | Robinson et al. |
| 9,780,950 B1 * | 10/2017 | Dundas .................. H04L 9/006 |
| 9,906,520 B2 | 2/2018 | Fouad et al. |
| 10,003,458 B2 | 6/2018 | Ylonen |
| 10,007,780 B1 | 6/2018 | Dhoot et al. |
| 10,027,659 B2 | 7/2018 | Hillis |
| 10,114,935 B2 | 10/2018 | Das et al. |
| 10,212,587 B2 | 2/2019 | Bentley et al. |
| 10,212,591 B1 | 2/2019 | Queru |
| 10,326,775 B2 | 6/2019 | Ford et al. |
| 10,523,437 B2 * | 12/2019 | Barbosa E Oliveira ............... G06F 21/44 |
| 10,686,767 B2 * | 6/2020 | Adler ..................... G06F 21/31 |
| 2005/0033968 A1 | 2/2005 | Dupouy et al. |
| 2006/0206919 A1 | 9/2006 | Montgomery et al. |
| 2006/0212407 A1 | 9/2006 | Lyon |
| 2007/0067618 A1 | 3/2007 | Sandhu et al. |
| 2007/0283159 A1 * | 12/2007 | Borsa .................... G07C 9/257 713/182 |
| 2008/0005339 A1 | 1/2008 | Kwan et al. |
| 2009/0006846 A1 | 1/2009 | Rosenblatt |
| 2009/0260077 A1 | 10/2009 | Zhu et al. |
| 2010/0131755 A1 * | 5/2010 | Zhu ..................... H04L 63/0815 713/155 |
| 2011/0026716 A1 | 2/2011 | Tang et al. |
| 2011/0145897 A1 * | 6/2011 | Tyree .................... G06F 21/42 726/6 |
| 2013/0263211 A1 * | 10/2013 | Neuman ............... H04L 9/3247 726/1 |
| 2015/0172920 A1 | 6/2015 | Ben Ayed |
| 2015/0200936 A1 * | 7/2015 | Kim ....................... H04L 9/321 713/171 |
| 2015/0215312 A1 | 7/2015 | Cesnik |
| 2017/0237725 A1 * | 8/2017 | Camenisch ............ H04L 9/008 713/171 |

OTHER PUBLICATIONS

Kurian, M. J., "Portable Security Tool for User Authentication," U.S. Appl. No. 16/688,022, filed Nov. 19, 2019, 62 pages.

* cited by examiner

SECURITY TOOL

TECHNICAL FIELD

This invention relates generally to network security, and specifically to a security tool.

BACKGROUND

With the recent proliferation of mobile device technology, the rise in cloud computing, and the popularity of work-from-home policies, many organizations have adopted technology policies permitting the use of external devices to access internal company systems, rather than restricting access to company devices connected to the internal network. These policies provide users with the flexibility to choose their preferred access devices as well as the ability to access the internal systems from any location, at any time, potentially increasing both user productivity and user satisfaction.

At the same time, such policies also bring with them increased network security risks. While traditional network security solutions, such as firewalls, anti-virus software, anti-spyware, security patch management, and virtual private networks continue to play a vital role in network protection, they may not be effective against hackers able to gain access to internal networks through the use of compromised user login credentials. Such access may result in the loss of sensitive data, such as trade secrets or consumer information, damage to data and/or equipment, and/or potential legal liability for failure to protect the personal information of the organization's consumers.

SUMMARY

With the recent proliferation of mobile device technology, the rise in cloud computing, and the popularity of work-from-home policies, many organizations have adopted technology policies permitting the use of external devices to access internal company systems, rather than restricting access to company devices connected to the company's internal network. These policies provide users with the flexibility to choose their preferred access devices as well as the ability to access the internal systems from any location, at any time, potentially increasing both user productivity and user satisfaction.

At the same time, such policies also bring with them increased network security risks. While traditional network security solutions, such as firewalls, anti-virus software, anti-spyware, security patch management, and virtual private networks continue to play a vital role in network protection, they may not be effective against hackers able to gain access to internal networks by using compromised user login credentials. Such access may result in the loss of sensitive data, such as trade secrets or consumer information, damage to data and/or equipment, and/or potential legal liability for failure to protect the personal information of the organization's consumers.

A number of methods exist to help maintain network security while nevertheless providing external access to a network; however, such methods tend to have weaknesses that may easily be exploited. As an example, one of the most widely used and basic forms of network security is the use of usernames and passwords. However, such login credentials may easily be compromised. For example, hackers may gain access to login credentials through: (1) phishing attempts, in which users may be tricked into providing their login credentials by emails and/or websites attempting to imitate communications and/or websites from legitimate sources; (2) the use of malware to capture login credentials through keystroke logging; (3) data and website breaches, in which hackers may gain access to personal information that includes login credentials; (4) interception of login credentials submitted over public Wi-Fi; and/or (5) brute force attempts to systematically discover usernames and passwords.

In comparison to a simple reliance on usernames and passwords, dual/multi-factor authentication methods have recently gained popularity as methods for providing enhanced network security. For example, such methods may rely on a device that the user has in his/her possession, through which the user may receive a verification code that is used to complete the login process. However, even though these methods provide enhanced security (by going a step beyond the simple entry of a username and password) they too are subject to weaknesses. For example, if, during a phishing attempt, a victim enters his/her login credentials into a fake login page, the attacker may forward these credentials to the real login page, thereby triggering the dual factor authentication procedure that prompts the user for the verification code that was sent to his/her device. By capturing this code—entered by the user into the fake page—the attacker gains a complete authentication set for the real page. While this authentication set is typically only useful for a single log-in to the user's account, once the attacker has successfully logged-in to the user's account, he/she may specify a new device to associate with the account (through which the attacker may receive future authentication codes), thereby gaining continued access to the account.

This disclosure contemplates a security tool that addresses one or more of the above technical problems. The tool is designed to sit at the edge between an external network and an organization's internal system. When a user seeks access to one or more subsystems of the organization's internal system, the tool launches a virtual host configured to receive the connection request from the user's device, without connecting the device to the internal subsystems and while attempting to isolate the device from the underlying physical resources of the tool (e.g., operating system, files, hardware, etc.). The subsequent behavior of the virtual host depends on the user's previous interactions with the system, if any. For example, if a connection request seeking access to the system represents the user's first attempt to access the system, the virtual host performs a traditional authentication of the user, using the user's login credentials. If the virtual host authenticates the user, the host provides the user with access to the system. The tool then generates a record of the locations within the system accessed by the user during the user's access session (for example, the record may indicate that the user accessed the first subsystem while logged into the system). The tool stores this record in both the internal system and on a device of the user, in the form of one or more alpha-numeric keys. During subsequent log-in attempts by the user, the tool uses the keys, along with the user's login credentials, to authenticate the user. This disclosure contemplates that in certain embodiments, each time the user interacts with the system, the tool updates the alpha-numeric keys, to reflect the additional locations within the system accessed by the user. Accordingly, even if a hacker is able to gain access to a user's set of keys from a given point in time, these keys will likely be of limited use. This is because any subsequent system access by the user will result in a modified set of keys, such that an authentication attempt using the previous set of keys (i.e. the keys obtained by the hacker at the given point in time) will fail. Certain embodiments of the security tool are described below.

According to one embodiment, a system includes a database and a hardware processor. The database stores a first key associated with a first user. The first key includes a first part of the first key and a second part of the first key. The first key was generated by a first subsystem in response to the first user accessing the first subsystem. The first part of the first key is further stored in an authentication string stored in a first device of the first user and the second part of the first key is further stored in a first authentication server. The hardware processor receives a first request indicating that the first user is seeking to access a second subsystem, wherein the first user previously accessed the first subsystem. The hardware processor further launches a first virtual host. The first virtual host performs a first authentication of the first user, without yet connecting the first user to the second subsystem. Performing the first authentication includes receiving the authentication string from the first user. The authentication string includes the first part of the first key and indicates that the first user previously accessed the first subsystem. Performing the first authentication also includes sending the authentication string to the first authentication server. The first authentication server stores the second part of the first key. The first authentication server extracts the first part of the first key from the authentication string. The first authentication server also assembles a test key including the first part of the first key and the second part of the first key. The first authentication server further determines that the test key matches the first key stored in the database. Performing the first authentication additionally includes receiving a first response from the first authentication server. The first response indicates that the first authentication server has authenticated the first user. In response to receiving the first response, the first virtual host launches a second virtual host. The second virtual host performs a second authentication of the first user, without yet connecting the first user to the second system. Performing the second authentication includes receiving login credentials from the first user. Performing the second authentication also includes sending the login credentials to a second authentication server. The second authentication server authenticates the first user and determines that the first user is authorized to access the second subsystem, based on the login credentials. Performing the second authentication additionally includes receiving a second response from the second authentication server. The second response indicates that the second authentication server has authenticated the first user based on the login credentials. In response to receiving the second response, the second virtual host provides the first user with access to the second subsystem.

According to another embodiment, a method includes receiving a first request indicating that a first user is seeking to access a second subsystem, wherein the first user previously accessed a first subsystem. The method also includes performing, using a first virtual host, a first authentication of the first user, without yet connecting the first user to the second system. Performing the first authentication includes receiving an authentication string from the first user. The authentication string is stored in a first device of the first user. The authentication string includes a first part of a first key. The first key is stored in a database and includes the first part of the first key and a second part of the first key. The first key was generated by the first subsystem in response to the first user accessing the first subsystem. Performing the first authentication also includes sending the authentication string to a first authentication server. The first authentication server stores the second part of the first key. The first authentication server extracts the first part of the first key from the authentication string. The first authentication server also assembles a test key. The test key includes the first part of the first key and the second part of the first key. The first authentication server additionally determines that the test key matches the first key stored in the database. Performing the first authentication further includes receiving a first response from the first authentication server. The first response indicates that the first authentication server has authenticated the first user. In response to receiving the first response, the method additionally includes performing, using a second virtual host, a second authentication of the first user, without yet connecting the first user to the second subsystem. Performing the second authentication includes receiving login credentials from the first user. Performing the second authentication also includes sending the login credentials to a second authentication server. The second authentication server authenticates the first user and determines that the first user is authorized to access the second subsystem, based on the login credentials. Performing the second authentication further includes receiving a second response from the second authentication server. The second response indicates that the second authentication server has authenticated the first user based on the login credentials. In response to receiving the second response, the method further includes providing, using the second virtual host, the first user with access to the second subsystem.

According to a further embodiment, a system includes a storage element and a processing element. The storage element is operable to store a first key associated with a first user. The first key includes a first part of the first key and a second part of the first key. The first key was generated by a first subsystem in response to the first user accessing the first subsystem. The first part of the first key is further stored in an authentication string stored in a first device of the first user and the second part of the first key is further stored in a first authentication server. The processing element is operable to receive a first request indicating that the first user is seeking to access a second subsystem, wherein the first user previously accessed the first subsystem. The processing element is also operable to launch a first virtual host. The first virtual host is operable to perform a first authentication of the first user, without yet connecting the first user to the second system. Performing the first authentication includes receiving the authentication string from the first user. The authentication string includes the first part of the first key and indicates that the first user previously accessed the first subsystem. Performing the first authentication also includes sending the authentication string to the first authentication server. The first authentication server stores the second part of the first key. The first authentication server is operable to extract the first part of the first key from the authentication string. The first authentication server is also operable to assemble a test key. The test key includes the first part of the first key and the second part of the first key. The first authentication server is additionally operable to determine that the test key matches the first key stored in the storage element. Performing the first authentication additionally includes receiving a first response from the first authentication server. The first response indicates that the first authentication server has authenticated the first user. In response to receiving the first response, the first virtual host is operable to launch a second virtual host. The second virtual host is operable to perform a second authentication of the first user, without yet connecting the first user to the second subsystem. Performing the second authentication includes receiving login credentials from the first user. The login credentials include a username and a password. Performing the second authentication also includes sending the login credentials to a second authentication server. The second authentication server is operable to authenticate the first user and determine that the first user to authorized to access the second subsystem, based on the login credentials. Performing the second authentication additionally includes receiving a second response from the second authentication server. The second response indicates that the second authentication server has authenticated the first user based on the login credentials. In response to receiving the second response, the second virtual host is operable to provide the first user with access to the second subsystem.

According to another embodiment, a system includes a hardware processor, a first virtual host, and a first subsystem. The hardware processor receives a first request indicating that a user is seeking to access the first subsystem. The hardware processor also launches the first virtual host. The first virtual host performs a first authentication of the user, without yet connecting the user to the first subsystem. Performing the first authentication includes receiving login credentials from the user. Performing the first authentication also includes sending the login credentials to a first authentication server. The first authentication server is configured to authenticate the user and determine that the user is authorized to access the first subsystem, based on the login credentials. Performing the first authentication also includes receiving a response from the first authentication server. The response indicates that the first authentication server has authenticated the user based on the login credentials. In response to receiving the response, the first virtual host provides the user with access to the first subsystem. In response to the user accessing the first subsystem, the first subsystem generates a first key associated with the user. The first subsystem also stores the first key in a database. The first subsystem further splits the first key into a first part of the first key and a second part of the first key. The first subsystem additionally sends the first part of the first key to the user, for storage in an authentication string stored in a first device of the user. The first subsystem also stores the second part of the first key in a second authentication server.

According to yet another embodiment, a method includes receiving a first request indicating that a user is seeking to access a first subsystem. The method also includes launching a first virtual host. The method additionally includes performing, using the first virtual host, a first authentication of the user, without yet connecting the user to the first subsystem. Performing the first authentication includes receiving login credentials from the user. Performing the first authentication also includes sending the login credentials to a first authentication server configured to authenticate the user and determine that the user is authorized to access the first subsystem, based on the login credentials. Performing the first authentication further includes receiving a response from the first authentication server. The response indicates that the first authentication server has authenticated the user based on the login credentials. In response to receiving the response, the method includes using the first virtual host to provide the user with access to the first subsystem. In response to the user accessing the first subsystem, the method includes generating a first key associated with the user. The method also includes storing the first key in a database. The method additionally includes splitting the first key into a first part of the first key and a second part of the first key. The method also includes sending the first part of the first key to the user, for storage in an authentication string stored in a first device of the user. The method further includes storing the second part of the first key in a second authentication server.

As a further embodiment, a system includes a storage element, a processing element, a first virtual host, and a first subsystem. The processing element is operable to receive a first request indicating that a user is seeking to access the first subsystem. The processing element is also operable to launch a first virtual host. The first virtual host is operable to perform a first authentication of the user, without yet connecting the user to the first subsystem. Performing the first authentication includes receiving login credentials from the user. The login credentials include a username and a password. Performing the first authentication also includes sending the login credentials to a first authentication server. The first authentication server is configured to authenticate the user and determine that the user is authorized to access the first subsystem, based on the login credentials. Performing the first authentication further includes receiving a response from the first authentication server. The response indicating that the first authentication server has authenticated the user based on the login credentials. In response to receiving the response, the first virtual host is operable to provide the user with access to the first subsystem. In response to the user accessing the first subsystem, the first subsystem operable to generate a first key associated with the user. The first subsystem is also operable to store the first key in the storage element. The first subsystem is further operable to split the first key into a first part of the first key and a second part of the first key. The first subsystem is additionally operable to send the first part of the first key to the user, for storage in an authentication string stored in a first device of the user. The first subsystem is further operable to store the second part of the first key in a second authentication server.

Certain embodiments provide one or more technical advantages. For example, an embodiment improves the security of an internal system to which external users are permitted access, by authenticating users based not only on login credentials, but also on sets of keys, stored on the users' devices, which change each time the users access the system. As another example, an embodiment prevents a hacker who has gained access to a user's login credentials from impersonating the user and accessing the system. As a further example, an embodiment authenticates a user, without providing the user's device with access to the internal system, and while limiting the exposure of the security tool to the user's device. The system described in the present disclosure may particularly be integrated into a practical application of a network security system for an internal network, which may authenticate users not only based on login credentials that the users provide to the system, but also by verifying that the users are able to provide records of their previous interactions with the system (in the form of alpha-numeric keys stored on devices of the users) that are consistent with the records stored in the system.

Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Embodiments of the present disclosure and its advantages may be understood by referring to FIGS. 1 through 5 of the drawings, like numerals being used for like and corresponding parts of the various drawings.

Figure 1:
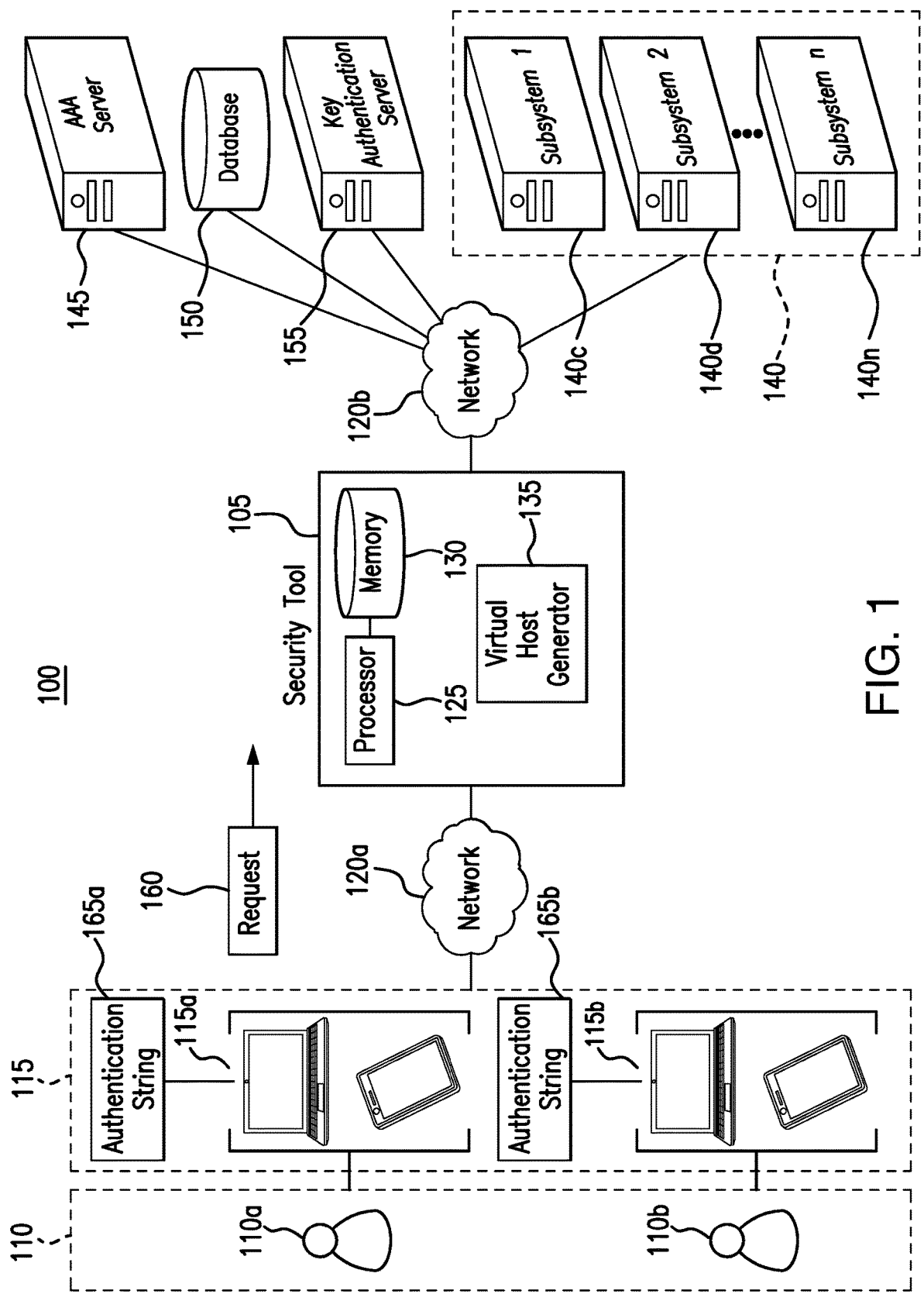
FIG. 1 illustrates an example security tool system.

FIG. 1 illustrates an example system 100 that includes security tool 105, users 110, devices 115, network 120a, network 120b, subsystems 140a through 140n, first authentication server 145, database 150, and second authentication server 155. Generally, security tool 105 receives connection requests 160 from devices 115, indicating that users 110 are seeking access to one or more subsystems 140a through 140n. For each connection request 160 submitted by device 115a, security tool 105 uses virtual host generator 135 to authenticate user 110a and provide user 110a with access to one or more subsystems of subsystems 140a through 140n.

Devices 115 may be used by users 110 to send connection requests 160, seeking access to internal subsystems 140, to security tool 105. This disclosure contemplates that connection requests 160 may include login credentials (for example, usernames and passwords), as well as authentication strings 165a and 165b. For a given user 110a, authentication string 165a may include a set of keys, as described in further detail below, in the discussion of FIGS. 2 and 3. Devices 115 may also be used by users 110 to send/receive data to/from internal subsystems 140, once access to internal subsystems 140 has been granted.

Devices 115 include any appropriate device for communicating with components of system 100 over network 120a. For example, devices 115 may be a telephone, a mobile phone, a computer, a laptop, a wireless or cellular telephone, a tablet, a server, and IoT device, and/or an automated assistant, among others. This disclosure contemplates devices 115 being any appropriate device for sending and receiving communications over network 120a. Device 115 may also include a user interface, such as a display, a microphone, keypad, or other appropriate terminal equipment usable by user 110a or 110b. In some embodiments, an application executed by device 115 may perform the functions described herein.

Network 120a facilitates communication between and amongst the various components of system 100 located outside of internal network 120b of subsystems 140. This disclosure contemplates network 120a being any suitable network operable to facilitate communication between such components of system 100. Network 120a may include any interconnecting system capable of transmitting audio, video, signals, data, messages, or any combination of the preceding. Network 120a may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Network 120b facilitates communication between and amongst the various components of security tool 105 and internal subsystems 140, first authentication server 145, database 150, and second authentication server 155. This disclosure contemplates network 120b being any suitable network operable to facilitate communication between the components of security tool 105 and subsystems 140, first authentication server 145, database 150, and second authentication server 155. Network 120b may include any interconnecting system capable of transmitting audio, video, signals, data, messages, or any combination of the preceding. Network 120b may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

As seen in FIG. 1, security tool 105 includes a processor 125 and a memory 130. This disclosure contemplates processor 125 and memory 130 being configured to perform any of the functions of security tool 105 described herein. Generally, security tool 105 implements virtual host generator 135 to launch one or more virtual hosts, configured to authenticate users 110, as described in further detail below, in the discussion of FIGS. 2 and 3.

Processor 125 is any electronic circuitry, including, but not limited to microprocessors, application specific integrated circuits (ASIC), application specific instruction set processor (ASIP), and/or state machines, that communicatively couples to memory 130 and controls the operation of security tool 105. Processor 125 may be 8-bit, 16-bit, 32-bit, 64-bit or of any other suitable architecture. Processor 125 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 125 may include other hardware and software that operates to control and process information. Processor 125 executes software stored on memory to perform any of the functions described herein. Processor 125 controls the operation and administration of security tool 105 by processing information received from network 120a, network 120b, device(s) 115, and memory 130. Processor 125 may be a programmable logic device, a microcontroller, a microprocessor, any suitable processing device, or any suitable combination of the preceding. Processor 125 is not limited to a single processing device and may encompass multiple processing devices.

Memory 130 may store, either permanently or temporarily, data, operational software, or other information for processor 125. Memory 130 may include any one or a combination of volatile or non-volatile local or remote devices suitable for storing information. For example, memory 130 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 130, a disk, a CD, or a flash drive. In particular embodiments, the software may include an application executable by processor 125 to perform one or more of the functions described herein.

Security tool 105 is connected through network 120b to internal subsystems 140, first authorization server 145, database 150, and second authorization server 155.

Internal subsystems 140 may be located on, or otherwise connected to, internal network 120b. Subsystems 140 may be used to run projects and process requests submitted by users 110. Subsystems 140 may include processors, storage elements, application servers, database servers, file servers, mail servers, print servers, web servers, or any other type of computational resource. A project submitted to subsystems 140 may use one or more subsystems 140a through 140n when executing. When a project uses more than one subsystem 140, communication between those servers used by the project occurs over network 120b. The computational capacity of a given subsystem 140 depends both on its hardware and software specifications.

Different subsystems 140a through 140n may be associated with different levels of user access. For example, a first user 110a may be permitted to access only first subsystem 140a and second subsystem 140b, while a second user 110b may be permitted to access all of subsystems 140a through 140n. In certain embodiments, first subsystem 140a may be associated with a password resetting procedure, such that whenever a user 110 attempts to access subsystems 140 for the first time (for example, with a temporary username and password provided by the system), the user is first directed to first subsystem 140a to change his/her username and/or password.

This disclosure contemplates that subsystems 140a through 140n are configured to generate records of user interactions with the subsystems. For example, in certain embodiments, subsystems 140a through 140n are configured to generate alpha-numeric keys, indicating that given users 110 have accessed the subsystems. Such alpha-numeric keys may be stored by subsystems 140a through 140n in database 150 as well as provided to users 110 for storage in authentication strings 165. The generation of such alpha-numeric keys is described in further detail below, in the discussion of FIGS. 2 and 3B.

First authentication server 145 is configured to authenticate a user 110a, based on authentication string 165a provided by a device 115a of user 110a to security tool 105. This disclosure contemplates that the authentication string provided by device 115a to security tool 105 may be provided through connection request 160 (either the same connection request 160 through which user 110a submits his/her login credentials, or a separate connection request 160). The operation of first authentication server 145 is described in further detail below, in the discussion of FIG. 3A.

Database 150 is configured to store data generated by subsystems 140a through 140n. For example, database 150 may be configured to store alpha-numeric keys, generated by subsystems 140a through 140n, as described in further detail below, in the discussion of FIGS. 2 and 3B. In certain embodiments, database 150 may represent one or more blockchains.

Second authentication server 155 is configured to authenticate a user 110a, based on login credentials provided by user 110a in connection request 160. This disclosure contemplates that second authentication server 155 may be any appropriate authentication server for authenticating users based on login credentials. For example, in certain embodiments, second authentication server 155 may be an authentication, authorization, and accounting (AAA) server. The operation of second authentication server 155 is described in further detail below, in the discussions of FIGS. 2 and 3B.

Figure 2:
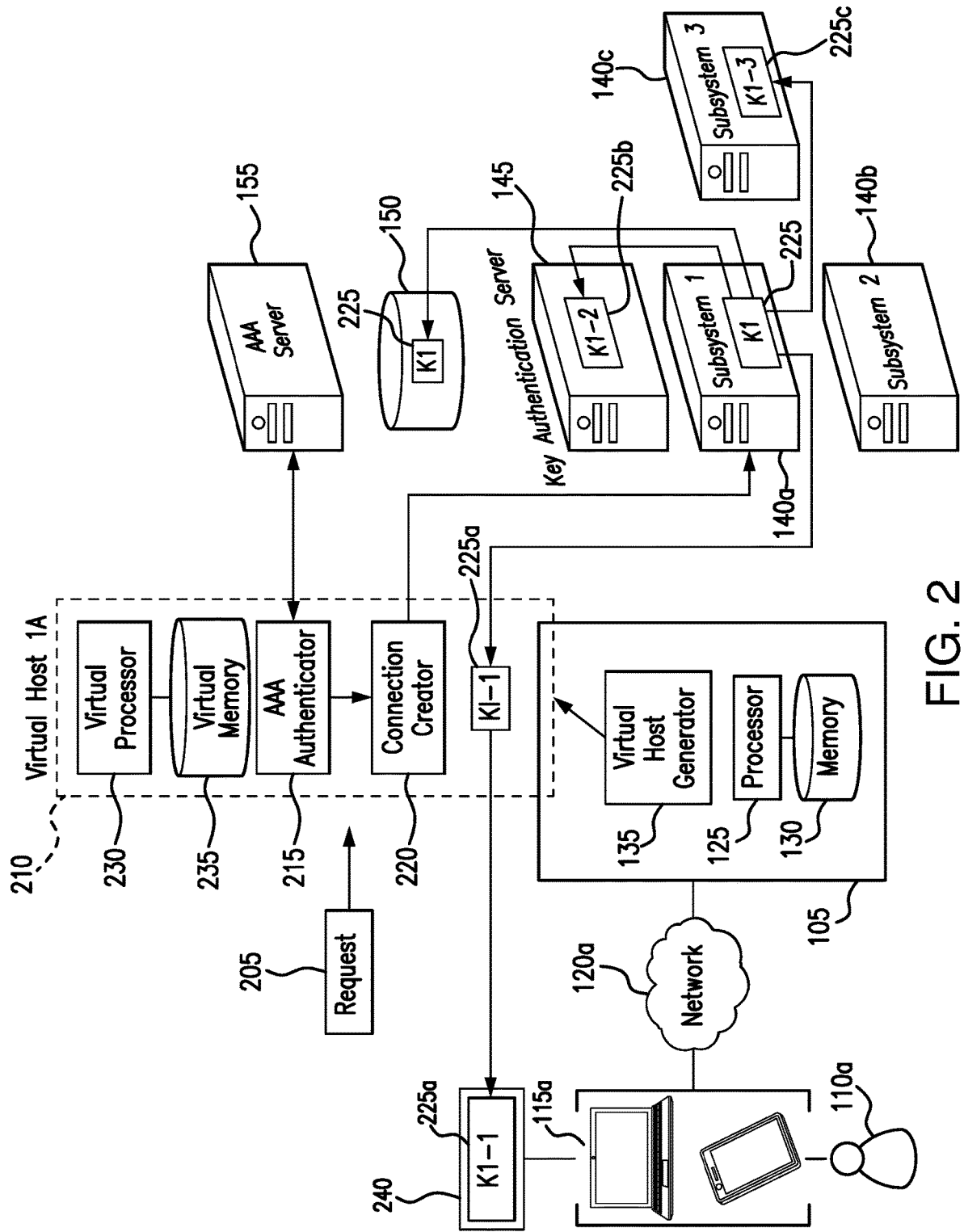
FIG. 2 illustrates an example of the behavior of the security tool system of FIG. 1, in response to a user seeking access to one or more subsystems of the system for the first time.
Figure 3A:
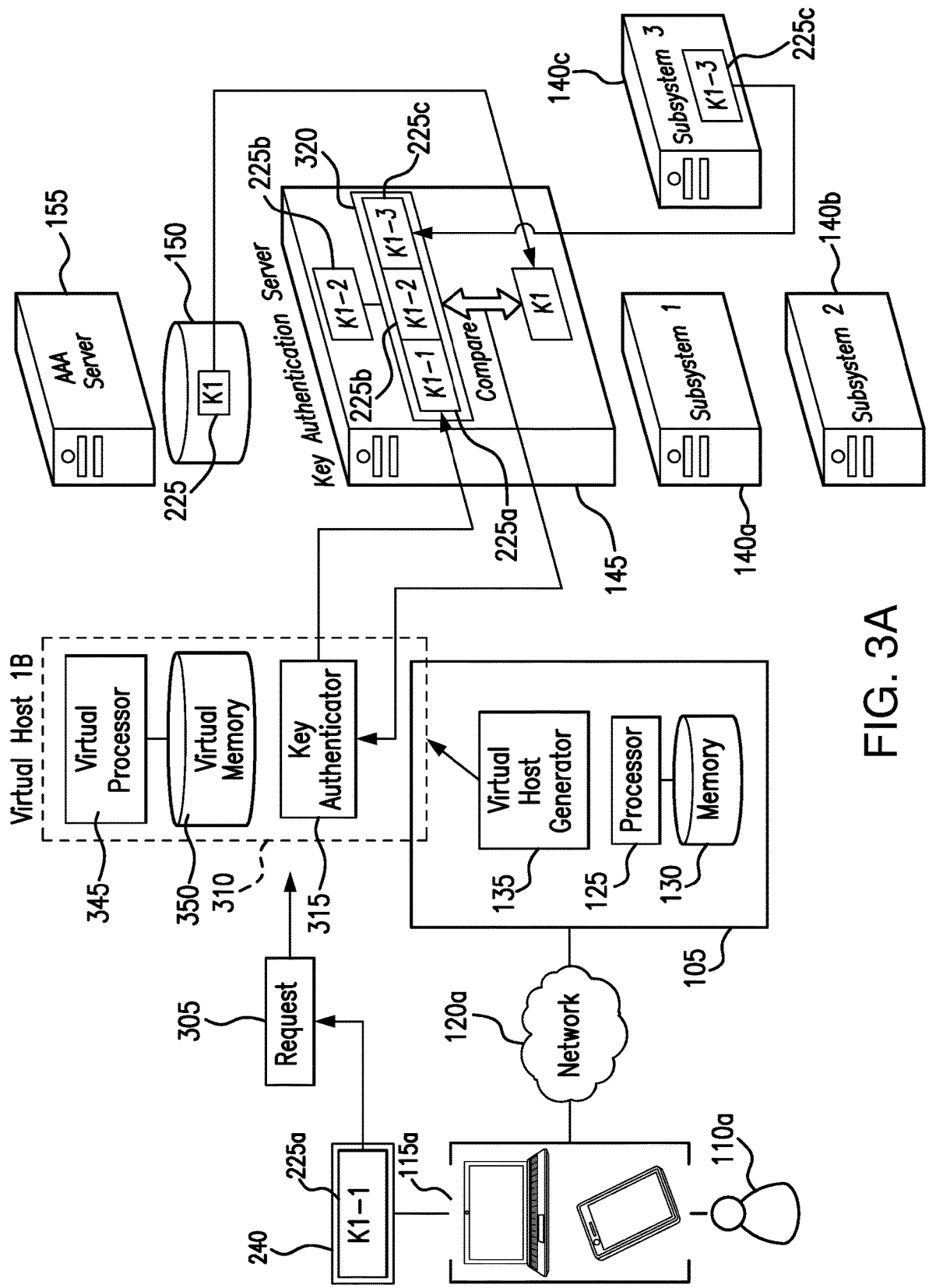
FIGS. 3A and 3B illustrate examples of the behavior of the security tool system of FIG. 1, in response to a user seeking access to a second subsystem of the system, after having previously accessed a first subsystem of the system.
Figure 3B:
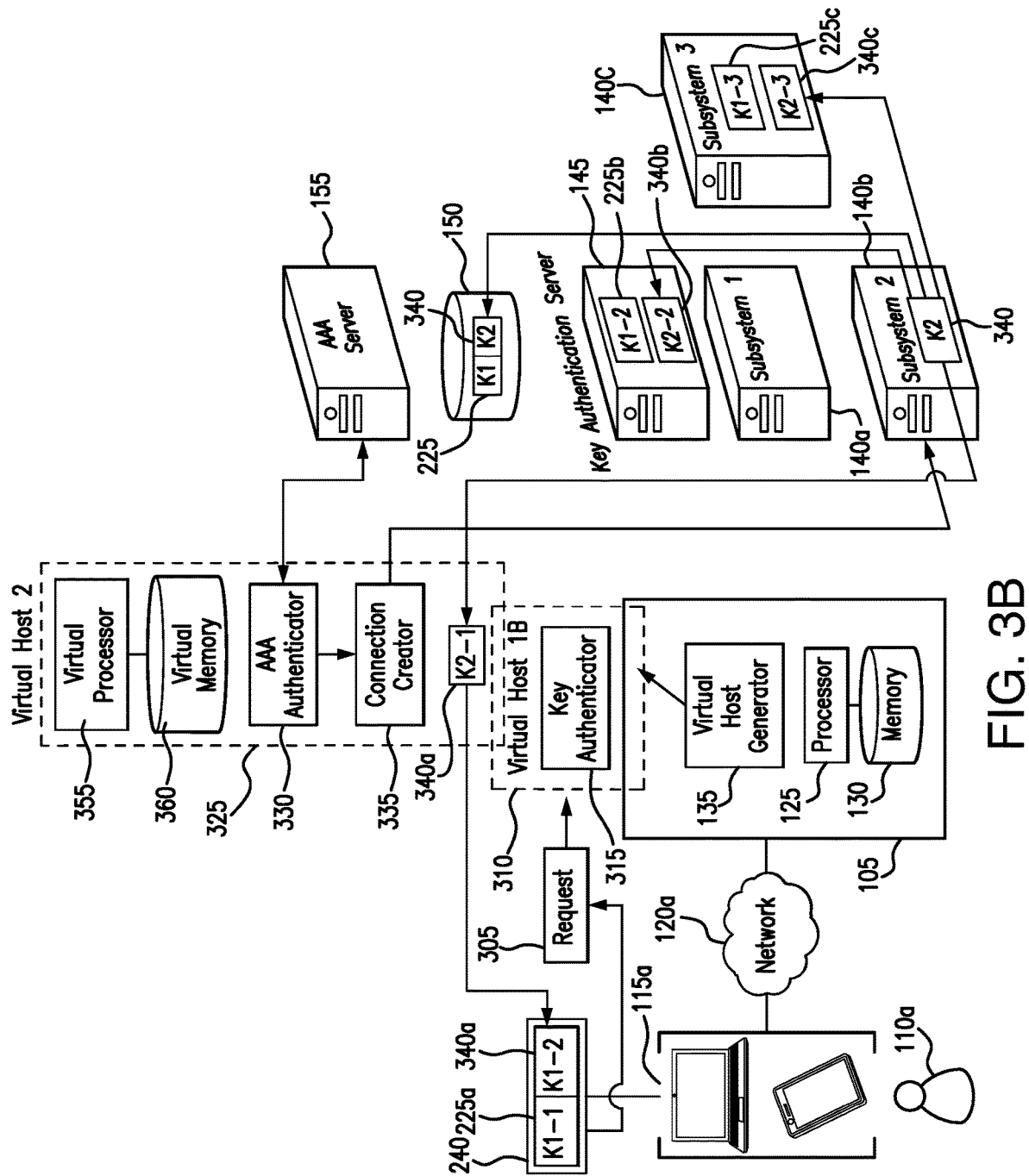

FIGS. 2 and 3 provide additional details illustrating the operation of security tool 105, first authentication server 145, second authentication server 155, and subsystems 140a through 140n, in response to security tool 105 receiving connection requests 160 from users 110 seeking access to subsystems 140. FIG. 2 illustrates the process by which a user who has not yet accessed any of subsystems 140, accesses first subsystem 140a and receives a partial key in response to such access, while FIGS. 3A and 3B illustrate the process by which a user who has previously accessed first subsystem 140a accesses second subsystem 140b.

As illustrated in FIG. 2, a user 110a, seeking access to subsystems 140 for the first time, may submit a connection request 205. This disclosure contemplates that connection request 205 may include the login credentials of user 110a. For example, connection request 205 may include a temporary username and password, provided by the system to user 110a and enabling user 110a to log into first subsystem 140a, where user 110a may be prompted to change his/her username and/or password.

Security tool 105 receives connection request 205, indicating that user 110a is seeking access to first subsystem 140a. In response to receiving connection request 205, security tool 105 uses virtual host generator 135 to launch a first virtual host 210. This disclosure contemplates that security tool 105 (and accordingly the virtual hosts generated by virtual host generator 135) is separate from subsystems 140, such that first virtual host 210 may authenticate user 110a, without yet providing device 115a, associated with user 110a, with access to any of subsystems 140a through 140n. The use of virtual hosts may be desirable, because each virtual host may function as a self-contained platform, running its own operating system and software. Accordingly, if a hacker is able to penetrate a virtual host's operating system, such penetration won't necessarily compromise the underlying actual operating system of security tool 105, stored in memory 130 and executed by processor 125. For example, if first virtual host 210 determines that user 110a has failed the authentication process (because his/her login credentials do not match those stored in second authentication server 155), security tool 105 may terminate first virtual host 210, thereby destroying any actions that user 110a may have performed on the virtual operating system.

This disclosure contemplates that the behavior of first virtual host 210, launched by virtual host generator 135 in response to detecting request 205, depends on the previous interactions of user 110a with subsystems 140. FIG. 2 illustrates the operation of virtual host 210 in response to receiving a request 205 from a user 110a who has not yet accessed any of subsystems 140a through 140n, while FIG. 3A illustrates the operation of virtual host 210 in response to receiving a request 305 from a user 110a who has previously accessed at least one of subsystems 140a through 140n.

As illustrated in FIG. 2, the software that first virtual host 210 may run on its own operating system includes traditional authenticator 215 and connection creator 220. This disclosure contemplates that traditional authenticator 215 and connection creator 220 may be software modules stored in virtual memory 235 and executed by virtual processor 230. This disclosure further contemplates that virtual memory 235 and virtual processor 230 are themselves software modules stored in memory 130 and executed by processor 125 An example of the operation of virtual host generator 135, in response to receiving request 205 from user 110a, who has not yet accessed any of subsystems 140a through 140n, is as follows: (1) determine that user 110a has submitted connection request 205 seeking access to one or more subsystems 140a through 140n; and (2) launch first virtual host 210, by generating virtual processor 230 and virtual memory 235, wherein virtual memory 235 stores traditional authenticator 215 and connection creator 220, and first virtual host 210 is configured to execute traditional authenticator 215 and connection creator 220.

Traditional authenticator 215 may receive login credentials from request 205 and send these login credentials to second authentication server 155. Second authentication server 155 may be configured to authenticate user 110a, based on the user's login credentials. This disclosure contemplates that second authentication server 155 may be any appropriate authentication server for authenticating users based on login credentials. For example, in certain embodiments, second authentication server 155 may be an authentication, authorization, and accounting (AAA) server. This disclosure contemplates that second authentication server 155 may maintain an internal record or database of user profiles, each profile storing the username and password for the given user and indicating the subsystems 140a through 140n to which the user is permitted access. Accordingly, when second authentication server 155 receives a connection request 205, including a username and password for user 110a, and indicating that user 110a is seeking access to first subsystem 140a, second authentication server 155 may first determine if the submitted username and password for user 110a match those stored in the profile assigned to user 110a. If the submitted username and password match those stored in user 110a's profile, second authentication server 155 may then determine whether user 110a's profile indicates that user 110a is allowed to access first subsystem 140a. If user 110a's profile indicates that user 110a is in fact permitted to access first subsystem 140a, second authentication server 155 may send a response to first virtual host 210, indicating that second authentication server 155 has authenticated user 110a for access to first subsystem 140a. In response to receiving a response from second authentication server 155 indicating that second authentication server 155 has authenticated user 110a based on the user's login credentials, traditional authenticator 215 may notify connection creator 220 to provide user 110a with access to first subsystem 140a. On the other hand, if second authentication server 155 determines either that the submitted username and password do not match those stored in user 110a's profile, or that user 110a is not permitted to access first subsystem 140a, second authentication server 155 may send a response to first virtual host 210, indicating that second authentication server 155 has failed to authenticate user 110a for access to first subsystem 140a. In response to receiving a response from second authentication server 155 indicating that second authentication server 155 has failed to authenticate user 110a, based on the login credentials provided by user 110a, traditional authenticator 215 may deny connection request 205.

An example of the operation of traditional authenticator 215 is as follows: (1) receive login credentials from user 110a through request 205; (2) send the login credentials to second authentication server 155; (3) receive a response from second authentication server 155 indicating either that second authentication server 155 has authenticated user 110a, or has failed to authenticate user 110a; (4) if the response indicates that second authentication server 155 has authenticated user 110a based on user 110a's login credentials, notify connection creator 220 and request that connection creator 220 provide user 110a with access to first subsystem 140a; (5) if the response indicates that second authentication server 155 has failed to authenticate user 110a based on user 110a's login credentials, deny connection request 205.

As mentioned above, if traditional authenticator 215 determines that second authentication server 155 has authenticated user 110a based on the user's login credentials, traditional authenticator 215 may instruct connection creator 220 to provide user 110a with access to first subsystem 140a. Connection creator 220 is configured to generate a connection between device 115a of user 110a and first subsystem 140a, such that device 115a may access data stored in first subsystem 140a, send data to first subsystem 140a, and/or otherwise interact with first subsystem 140a.

An example of the operation of connection creator 220 is as follows: (1) receive an indication from traditional authenticator 215 that second authentication server has authenticated user 110a for access to first subsystem 140a; (2) determine whether device 115a is attempting to access data stored in first subsystem 140a; (3) if device 115a is attempting to access data stored in first subsystem 140a, allow device 115a to access the data; (4) determine whether device 115a is attempting to send data to first subsystem 140a; (5) if device 115a is attempting to send data to first subsystem 140a, allow device 115a to send data to first subsystem 140a.

In order to provide an extra layer of security to future attempts by user 110a to access subsystems 140, in response to user 110a accessing first subsystem 140a, first subsystem 140a is configured to generate a first key 225 associated with user 110a. This disclosure contemplates that first key 225 stores a record of user 110a's interaction with first subsystem 140a. For example, in certain embodiments, first key 225 indicates that user 110a has accessed first subsystem 140a. This disclosure contemplates that first key 225 stores data indicating that user 110a has accessed first subsystem 140a in any suitable format. For example, in certain embodiments, first key 225 is an alpha-numeric string. As another example, in certain embodiments, first key 225 is a hash value. In certain embodiments, first key 225 is encrypted.

In order to use first key 225 to provide an extra layer of security to future attempts by user 110a to access subsystems 140, this disclosure contemplates that first subsystem 140a stores first key 225 and/or portions of first key 225 in multiple locations. For example, first subsystem 140a stores first key 225 in database 150. In certain embodiments, database 150 may be a blockchain. First subsystem 140a may additionally split first key 225 into a first part 225a and a second part 225b. First subsystem 140a may then send first part 225a of first key 225 to user 110a, for storage in authentication string 240 stored on device 115a. First subsystem 140a may also store second part 225b of first key 225 in first authentication server 145. In certain embodiments, first subsystem 140a may additionally split first key 225 into a third part 225c and store third part 225c in third subsystem 140c. In this manner, first subsystem 140a generates a record of user 110a's access to first subsystem 140a, which security tool 105 may use to further authenticate user 110a, when user 110a seeks to access subsystems 140 in the future; during future access attempts, not only should the login credentials provided by user 110a match the credentials stored in authentication server 155, but authentication string 240, stored on device 115a of user 110a, should also be consistent with first key 225, associated with user 110a and stored in database 150. For a given future access attempt, if either of these conditions is not true, security tool 105 may reject the access attempt. The authentication of user 110a, based on authentication string 240, is described in further detail below, in the discussion of FIGS. 3A and 3B.

In certain embodiments, first subsystem 140a may be configured to generate first key 225 only in response to user 110a accessing first subsystem 140a for the first time. In some embodiments, first subsystem 140a may be configured to generate first key 225 each time user 110a accesses subsystems 140a. In certain such embodiments, subsystem 140a may replace first key 225 stored in database 150 and associated with user 110a's previous access to subsystem 140a with the newly generated first key 225. Additionally, first part 225a of newly generated first key 225 may be sent to user 110a to replace first part 225a of first key 225 associated with user 110a's previous access to subsystem 140a and stored in user 110a's authentication string 240, and second part 225b of newly generated first key 225 may be sent to first authentication server 145 to replace second part 225b of first key 225 associated with user 110a's previous access to subsystem 140a and stored in first authentication server 145. In some embodiments, first subsystem 140a may be configured to modify first key 225 associated with user 110a's previous access to subsystem 140a, to indicate the number of times user 110a has accessed subsystem 140a. For example, if user 110a accesses subsystem 140a for a second time, subsystem 140a may be configured to append the numeral "2" to both first part 225a and second part 225b of first key 225 associated with user 110a's previous access to subsystem 140a, and to correspondingly modify first part 225a of first key 225 stored in user 110a's authentication string 240, second part 225b of first key 225 stored in first authentication server 145, and complete first key 225 stored in database 150.

While FIG. 2 illustrates the behavior of system 100 in response to security tool 105 receiving request 205 from a user 110a who had not previously accessed any of subsystems 140a through 140n, FIGS. 3A and 3B illustrate the behavior of system 100 in response to receiving a subsequent request 305 from user 110a to access second subsystem 140b, following user 110a's previous access to first subsystem 140a.

FIG. 3A illustrates the behavior of system 100 prior to providing user 110a with access to second subsystem 140b. As described above, the example presented in FIGS. 3A and 3B contemplates that user 110a has previously accessed first subsystem 140a. Accordingly, an authentication string 240 including first part 225a of first key 225 is stored on a device 115a of user 110a, indicating that user 110a has previously accessed first subsystem 140a. Additionally, first authentication server 145 stores second part 225b of first key 225, and database 150 stores the full first key 225. In certain embodiments, third subsystem 140c may additionally store a third part 225c of first key 225.

As illustrated in FIG. 3A, request 305 indicates that user 110a is seeking access to second subsystem 140b. In certain embodiments, request 305 may contain both user 110a's login credentials and authentication string 240. In some embodiments, user 110a may submit multiple requests 305 to security tool 105. For example, a first request 305 may include user 110a's authentication string 240, while a second request 305 may include user 110a's login credentials. Security tool 105 receives request 305. In response to receiving connection request 305, security tool 105 uses virtual host generator 135 to launch a first virtual host 310. This disclosure contemplates that first virtual host 310 may operate as a self-contained platform, running its own operating system and software, and is configured to authenticate user 110a, without connecting any of user 110a's devices 115a to subsystems 140. Accordingly, if a hacker is able to penetrate a virtual host's operating system, such penetration won't necessarily compromise the underlying actual operating system of security tool 105, stored in memory 130 and executed by processor 125. For example, if first virtual host 310 determines that user 110a has failed the authentication process, security tool 105 may terminate first virtual host 310, thereby destroying any actions that user 110a may have performed on the virtual operating system.

As illustrated in FIG. 3A, the software that first virtual host 310 may run on its own operating system includes key authenticator 315. Key authenticator 315 may be a software module stored in virtual memory 350 and executed by virtual processor 345. This disclosure further contemplates that virtual memory 350 and virtual processor 345 are themselves software modules stored in memory 130 and executed by processor 125. This disclosure contemplates that first virtual host 310 runs key authenticator 315 in response to receiving a request 305 from a user 110a who has previously accessed at least one of subsystems 140a through 140n. An example of the operation of virtual host generator 135, in response to receiving request 305 from user 110a, who has previously accessed at least one of subsystems 140a through 140n, is as follows: (1) determine that user 110a has submitted connection request 305 seeking access to one or more subsystems 140a through 140n; and (2) launch first virtual host 310, by generating virtual processor 345 and virtual memory 350, wherein virtual memory 350 stores key authenticator 315, and first virtual host 310 is configured to execute key authenticator 315.

Key authenticator 315 may receive authentication string 240 from request 305, including first part 225a of first key 225. In certain embodiments, key authenticator 315 may send the full authentication string 240 to first authentication server 145. In some embodiments, key authenticator 315 may extract first part 225a of first key 225 from authentication string 240 and send first part 225a of first key 225 to first authentication server 145.

In response to receiving first part 225a of first key 225 from key authenticator 315 (either separately, or as part of authentication string 240), first authentication server 145 is configured to authenticate user 110a, based on first part 225a of first key 225. In certain embodiments in which first authentication server 145 receives authentication string 240 from key authenticator 315, first authentication server 145 may extract first part 225a of first key 225 from authentication string 240. In some embodiments, first authentication server 145 may receive first part 225a of first key 225 directly from key authenticator 315. First authentication server 145 may then combine first part 225a of first key 225 with second part 225b of first key 225, stored in first authentication server 145, to form a test key 320. In certain embodiments, first authentication server 145 may additionally combine third part 225c of first key 225 with first part 225a and second part 225b of first key 225, to form test key 320. First authentication server 145 may then compare test key 320 to first key 225 stored in database 150. If test key 320 matches first key 225 stored in database 150, first authentication server 145 may send a response to key authenticator 315 indicating that first authentication server 145 has authenticated user 110a, based on first key 225.

While FIG. 3A illustrates an example in which authentication string 240 contains one partial key 225a, this disclosure contemplates that first authentication server 145 may be configured to authenticate user 110a, based on any number of partial keys 225a stored in authentication string 240. For example, in certain embodiments, first authentication server 145 may be configured to receive authentication string 240 from key authenticator 315 and authenticate user 110a based on each of the partial keys 225 stored in authentication string 240. In certain such embodiments, authenticating user 110a based on each of the keys 225 may include extracting the first parts 225a of the keys from authentication string 240, combining the first parts 225a of the keys with second parts 225b of the keys stored in first authentication server 145 to form test keys 320, and comparing the test keys 320 with the full keys 225 stored in database 150. If the test keys 320 match the keys 225 stored in database 150, first authentication server 145 may send a response to first virtual host 310 indicating that it has authenticated user 110a, based on the keys.

As another example, in some embodiments, first virtual host 310 may be configured to authenticate user 110a based on first key 225, and then launch additional virtual hosts 310 to authenticate user 110a based on any other keys 225 stored in authentication string 240. In certain such embodiments, first virtual host 310 may extract the first part 225a of the first key and send first part 225a of the first key to first authentication server 145, to authenticate user 110a based on first key 225. Authenticating user 110a based on first key 225 may include combining first part 225a of the first key with second part 225b of the first key to form test key 320, and comparing test key 320 with first key 225 stored in database 150. If test key 320 matches first key 225 stored in database 150, first authentication server 145 may send a response to first virtual host 310 indicating that it has authenticated user 110a based on first key 225. If authentication string 240 includes a first part 225a of a second key, first virtual host 310 may launch a second virtual host 310 configured to extract the first part 225a of the second key and send the first part 225a of the second key to first authentication server 145, to authenticate user 110a based on the second key 225. This process may repeat for each first part 225a of a key stored in authentication string 240. For example, if authentication string 240 includes N first parts 225a of keys, authentication of user 110a based on the keys may conclude when an N-th virtual host 310 has extracted the first part 225a of the N-th key, sent the first part 225a of the N-th key to first authentication server 145 for authentication, and received a response indicating that first authentication server 145 has authenticated user 110a based on the N-th key.

Once key authenticator 315 has received a response from first authentication server 145, indicating that first authentication server 145 has authenticated user 110a based on first key 225, key authenticator 315 may then launch a second virtual host, as described in further detail below, in the discussion of FIG. 3B, to authenticate user 110a based on user 110a's login credentials. On the other hand, if test key 320 does not match first key 225 stored in database 150, first authentication server 145 may send a response to key authenticator 315 indicating that first authentication server 145 has failed to authenticate user 110a, based on first key 225. Key authenticator 315 may then deny request 305. In response to key authenticator 315 denying request 305, security tool 105 may terminate first virtual host 310.

An example of the operation of key authenticator 315 in response to receiving a request 305 from a user 110a who has previously accessed first subsystem 140a is as follows: (1) receive authentication string 240 from request 305, including first part 225a of first key 225; (2) send authentication string 240 to first authentication server 145; (3) receive a response from first authentication server 145 indicating whether first authentication server 145 has authenticated user 110a based on first key 225; (4a) if the response indicates that first authentication server 145 authenticated user 110a based on first key 225, launch a second virtual host; (4b) if the response indicates that first authentication server 145 failed to authenticate user 110a based on first key 225, deny request 305.

FIG. 3B illustrates the behavior of security tool 105 in response to first authentication server 145 authenticating user 110a, based on first key 225. As described above, in the discussion of FIG. 3A, in response to receiving a response from first authentication server 145 indicating that first authentication server 145 has authenticated first user 110a based on first key 225, key authenticator 315 may launch a second virtual host 325. This disclosure contemplates that second virtual host 325 is configured to behave in a similar manner as first virtual host 210 described above, in the discussion of FIG. 2. For example, second virtual host 325 may operate as a self-contained platform, running its own operating system and software, which includes traditional authenticator 330 and connection creator 335. Accordingly, if a hacker is able to penetrate a virtual host's operating system, such penetration won't necessarily compromise the underlying actual operating system of security tool 105, stored in memory 130 and executed by processor 125. For example, if second virtual host 325 determines that user 110a has failed the authentication process (because his/her login credentials do not match those stored in second authentication server 155), security tool 105 may terminate second virtual host 325, thereby destroying any actions that user 110a may have performed on the virtual operating system.

As illustrated in FIG. 3B, the software that second virtual host 325 may run on its own operating system includes traditional authenticator 330 and connection creator 335. This disclosure contemplates that traditional authenticator 330 and connection creator 335 may be software modules stored in virtual memory 360 and executed by virtual processor 355. This disclosure further contemplates that virtual memory 360 and virtual processor 355 are themselves software modules stored in memory 130 and executed by processor 125

Traditional authenticator 330 may receive user 110a's login credentials from request 305 and send these login credentials to second authentication server 155. Second authentication server 155 may then send a response to traditional authenticator 330 indicating whether second authenticator 155 was able to authenticate user 110a for access to second subsystem 140b, based on the user's login credentials. As described above, in the discussion of FIG. 2, this disclosure contemplates that second authentication server 155 may be any appropriate authentication server for authenticating users based on login credentials. For example, in certain embodiments, second authentication server 155 may be an authentication, authorization, and accounting (AAA) server. This disclosure contemplates that second authentication server 155 may maintain an internal record or database of user profiles, each profile storing the username and password for the given user and indicating the subsystems 140a through 140n to which the user is permitted access. Accordingly, when second authentication server 155 receives a connection request 305, including a username and password for user 110a, and indicating that user 110a is seeking access to second subsystem 140b, second authentication server 155 may first determine if the submitted username and password for user 110a match those stored in the profile assigned to user 110a. If the submitted username and password match those stored in user 110a's profile, second authentication server 155 may then determine whether user 110a's profile indicates that user 110a is allowed to access second subsystem 140b. If user 110a's profile indicates that user 110a is in fact permitted to access second subsystem 140b, second authentication server 155 may send a response to second virtual host 325, indicating that second authentication server 155 has authenticated user 110a for access to second subsystem 140b.

If traditional authenticator 330 receives a response from second authentication server 155 indicating that second authentication server 155 has authenticated user 110a based on the user's login credentials, traditional authenticator 330 may instruct connection creator 335 to provide user 110a with access to second subsystem 140b. On the other hand, if second authentication server 155 fails to authenticate user 110b based on the user's login credentials, second authentication server 155 may send a response to second virtual host 325, indicating that second authentication server 155 has failed to authenticate user 110a for access to second subsystem 140b. In response to receiving a response from second authentication server 155 indicating that second authentication server 155 has failed to authenticate user 110a based on the login credentials provided by user 110a, traditional authenticator 330 may deny connection request 305. In response to traditional authenticator 330 denying connection request 305, security tool 105 may terminate first virtual host 310 (which in turn also terminates second virtual host 325).

An example of the operation of traditional authenticator 330 is as follows: (1) receive login credentials from user 110a through request 305; (2) send the login credentials to second authentication server 155; (3) receive a response from second authentication server 155 indicating either that second authentication server 155 has authenticated user 110a, based on user 110'a login credentials, or has failed to authenticate user 110a; (4) if the response indicates that second authentication server 155 has authenticated user 110a based on user 110a's login credentials, notify connection creator 335 to provide user 110a with access to second subsystem 140b; (5) if the response indicates that second authentication server 155 has failed to authenticate user 110a based on user 110a's login credentials, deny connection request 305.

As mentioned above, if traditional authenticator 330 determines that second authentication server 155 has authenticated user 110a based on the user's login credentials, traditional authenticator 330 instructs connection creator 335 to provide user 110a with access to second subsystem 140b. Connection creator 335 is configured to generate a connection between device 115a of user 110a and second subsystem 140a, such that device 115a may access data stored in second subsystem 140b, send data to second subsystem 140b, or otherwise interact with second subsystem 140b.

This disclosure contemplates that in certain embodiments, user 110a may access second subsystem 140b using a different device 115a from that which user 110a used to provide authentication string 240 to security tool 105. For example, in certain embodiments, user 110a may send connection request 305 from a first device 115a, wherein connection request 305 indicates that user 110a is seeking to access second subsystem 140b using first device 115a. Separately, a second device 115a (for example, a wearable, or other IoT device associated with user 110a) may submit an additional connection request 305, which includes authentication string 240.

An example of the operation of connection creator 335 is as follows: (1) receive an indication from traditional authenticator 330 that second authentication server has authenticated user 110a for access to second subsystem 140b; (2) determine whether device 115a is attempting to access data stored in second subsystem 140a; (3) if device 115a is attempting to access data stored in second subsystem 140b, allow device 115a to access the data; (4) determine whether device 115a is attempting to send data to second subsystem 140b; (5) if device 115a is attempting to send data to second subsystem 140b, allow device 115a to send data to second subsystem 140b.

In response to user 110a accessing second subsystem 140b, second subsystem 140b may generate a second key 340, associated with user 110a, and indicating that user 110a has accessed second subsystem 140b. This disclosure contemplates that second key 340 stores data indicating that user 110a has accessed first subsystem 140b in any suitable format. For example, in certain embodiments, second key 340 is an alpha-numeric string. As another example, in certain embodiments, second key 340 is a hash value. In certain embodiments, second key 340 is encrypted.

Second subsystem 140b may store second key 340 in database 150. In certain embodiments, database 150 is a blockchain. Second subsystem 140b may additionally split second key 340 into a first part 340a and a second part 340b. Second subsystem 140b may send first part 340a of second key 340 to user 110a for storage in authentication string 240 stored on device 115a. Second subsystem 140b may also store second part 340b of second key 340 in first authentication server 145. In certain embodiments, second subsystem 140b may additionally split second key 340 into a third part 340c and store third part 340c in third subsystem 140c. In this manner, second subsystem 140b adds to the record of user 110a's access to subsystems 140, which security tool 105 may use to further authenticate user 110a, when user 110a seeks to access subsystems 140 in the future.

This disclosure contemplates that subsystems 140a through 140n are configured to generate keys and to split these keys into any number of parts. For example, in addition to splitting second key 340 into first part 340a, second part 340b, and third part 340c, this disclosure contemplates that in certain embodiments, second subsystem 140b may be configured to split second key 340 into fourth part 340d. Second subsystem 140b may then store fourth part 340d in any appropriate location in system 100. For example, in certain embodiments, second subsystem 140b may store fourth part 340d in second subsystem 140b.

This disclosure further contemplates that in certain embodiments, a given subsystem 140a may be configured to generate a key only in response to a user 110a accessing subsystem 140a for a first time. In some embodiments, a given subsystem 140a may be configured to generate a key each time a user 110a accesses subsystem 140a. In certain such embodiments, subsystem 140a may replace the key stored in database 150 and associated with user 110a's previous access to subsystem 140a with the newly generated key. Additionally, the first part of the newly generated key may replace the first part of the key associated with user 110a's previous access to subsystem 140a and stored in user 110a's authentication string, and the second part of the newly generated key may replace the second part of the key associated with user 110a's previous access to subsystem 140a and stored in first authentication server 145. In some embodiments, a given subsystem 140a may be configured to modify a key associated with user 110a's previous access to subsystem 140a, to indicate the number of times user 110a has accessed subsystem 140a. For example, if user 110a accesses subsystem 140a for a second time, subsystem 140a may be configured to append the numeral "2" to both the first part and the second part of the key associated with user 110a's previous access to subsystem 140a, and to correspondingly modify the first part of the key stored in user 110a's authentication string, the second part of the key stored in first authentication server 145, and the complete key stored in database 150.

Given that, in certain embodiments, authentications string 240 changes after each time user 110a accesses the system (for example, a new key may be generated after user 110a accesses a new subsystem, or an existing key may be modified after user 110a accesses a subsystem he/she has previously accessed), even if a hacker is able to gain access to user 110a's authentication string 240 from a given point in time, this authentication string will likely be of limited use. This is because any subsequent system access by user 100a will result in a modified authentication string 240, such that an authentication attempt using a previous authentication string 240 (i.e. the authentication string 240 obtained by the hacker at the given point in time) will fail.

In this manner, in certain embodiments, security tool 105 may help to protect internal subsystems 140 from security threats arising from compromised login credentials, by providing an extra layer of protection in the form of an authentication string stored on a device of the user. The authentication string contains a set of partial keys, indicating those subsystems of subsystems 140a through 140n, which the user has previously accessed. When the user attempts to log into a given subsystem, in addition to authenticating the user based on his/her provided login credentials, security tool 105 authenticates the user by verifying that the set of partial keys stored in the authentication string on his/her device is consistent with the keys stored in database 150. By confirming that the user has a record of his/her previous access to subsystems 140, security tool 105 helps to ensure that the user is not simply impersonating another user, using that other user's login credentials.

Figure 4:
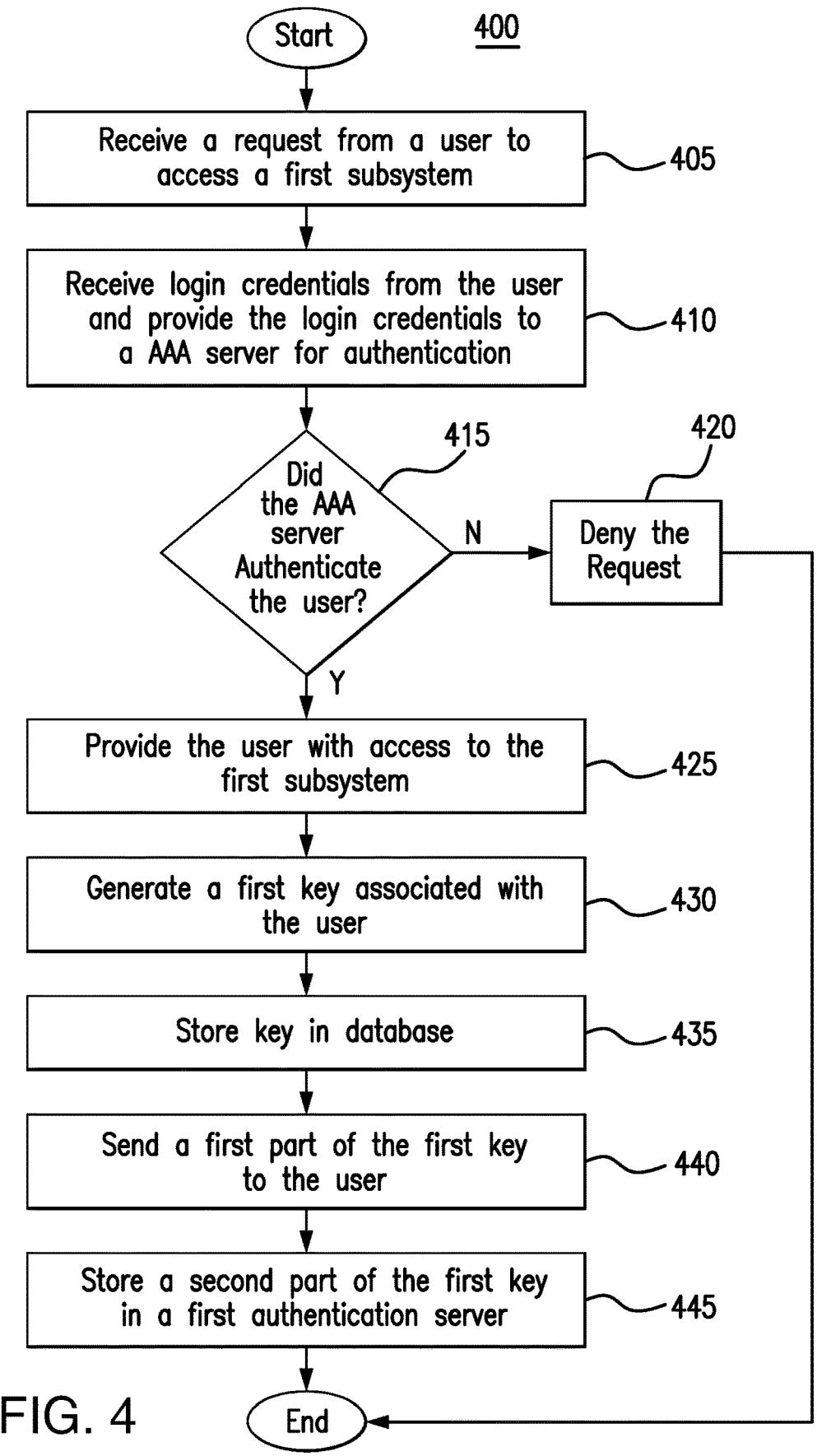
FIG. 4 presents a flowchart illustrating the process by which a given subsystem of the system in FIG. 1 generates a key in response to a user accessing the given subsystem.
Figure 5:
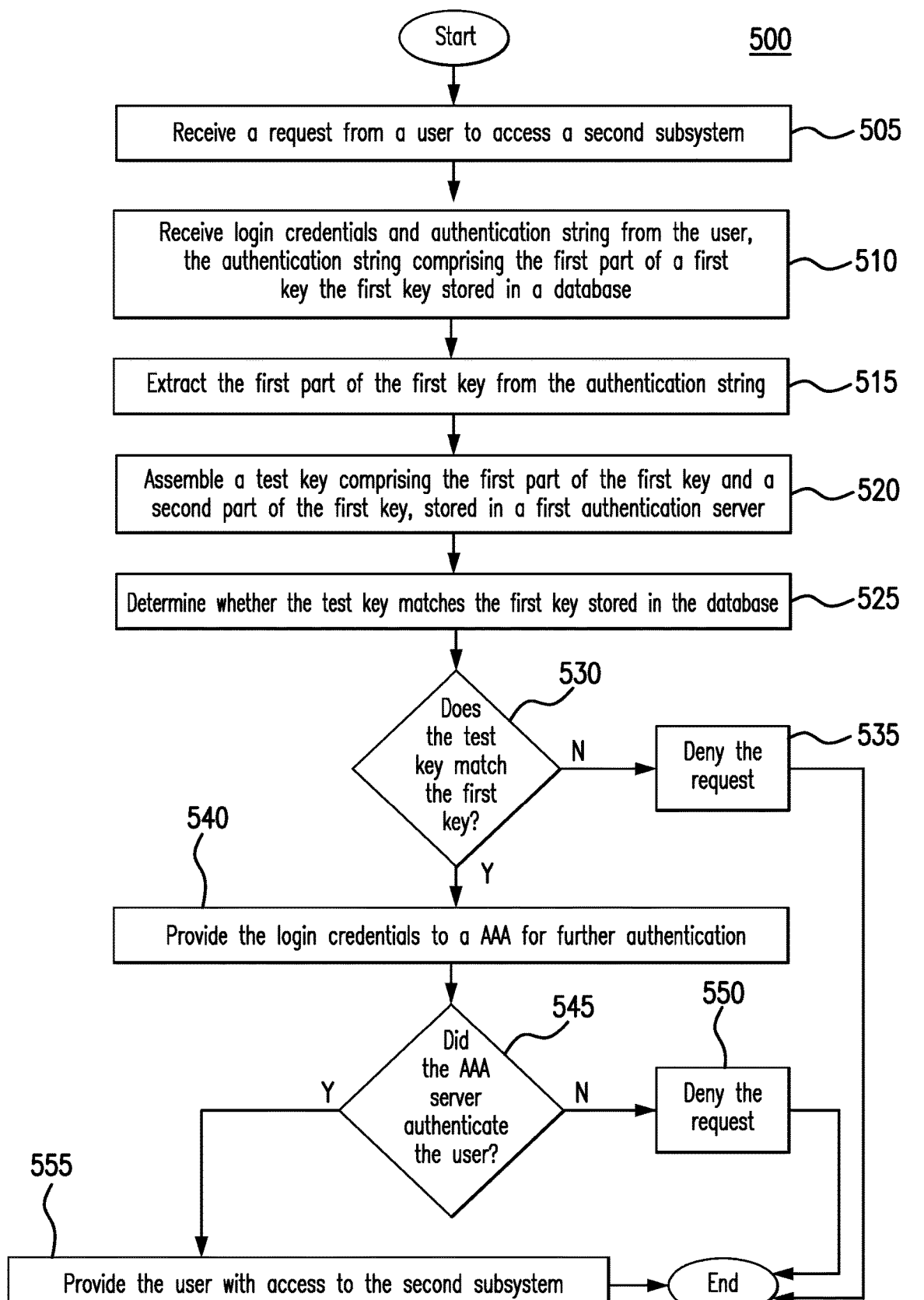
FIG. 5 presents a flowchart illustrating the process by which the security tool system of FIG. 1 authenticates a user based on both the user's login credentials and a key, previously generated in response to the user accessing a subsystem of the system.

FIGS. 4 and 5 present flow charts illustrating the operation of security tool 105, first authentication server 145, second authentication server 155, and subsystems 140a through 140n, in response to security tool 105 receiving connection requests 160 from users 110 seeking access to a given subsystem of subsystems 140a through 140n. FIG. 4 presents a flow chart illustrating the process by which a user who has not yet accessed any of subsystems 140, is authenticated for access to first subsystem 140a, accesses first subsystem 140a, and receives a partial key in response to such access, while FIG. 5 presents a flow chart illustrating the process by which a user who has previously accessed first subsystem 140a accesses second subsystem 140b.

As illustrated in FIG. 4, in step 405, security tool 105 receives a request 205 from user 110a, indicating that user 110a is seeking access to first subsystem 140a. In response to receiving request 205, security tool launches a first virtual host 210. In step 410, security tool 105 uses first virtual host 210 to receive login credentials from user 110a and to provide the login credentials to second authentication server 155. In certain embodiments, the login credentials include a username and a password. In some embodiments, second authentication server 155 is a AAA server.

In step 415, security tool 105 uses first virtual host 210 to receive a response from second authentication server 155, from which first virtual host 210 determines whether second authentication server 155 authenticated user 110a for access to first subsystem 140a. If, in step 415, first virtual host 210 determines that second authentication server 155 did not authenticate user 110a for access to first subsystem 140a, in step 420, first virtual host 210 denies the connection request and security tool 105 terminates first virtual host 210.

On the other hand, if, in step 415, first virtual host 210 determines that second authentication server 155 did in fact authentication user 110a for access to first subsystem 140a, then, in step 425, first virtual host 210 provides user 110a with access to first subsystem 140a.

In response to user 110a accessing first subsystem 140a, in step 430, first subsystem 140a generates a first key associated with user 110a and indicating that user 110a has accessed first subsystem 140a. In step 435, first subsystem 140a stores the first key in database 150. In step 440, first subsystem 140a sends a first part of the first key to user 110a, for storage in an authentication string stored on a device 115a of user 110a. Finally, in step 445, first subsystem 140a stores a second part of the first key in first authentication server 145.

Modifications, additions, or omissions may be made to method 400 depicted in FIG. 4. Method 400 may include more, fewer, or other steps. For example, steps may be performed in parallel or in any suitable order. While discussed as security tool 105 (or components thereof) performing the steps, any suitable component of system 100, such as device(s) 115 for example, may perform one or more steps of the method.

FIG. 5 presents a flow chart illustrating the process by which security tool 105 authenticates a user 110 based on both the user's login credentials and an authentication string, where the authentication string includes a partial key, indicating that the user 110 has previously accessed first subsystem 140a.

In step 505, security tool 105 receives a request 305 from a user 110a seeking access to second subsystem 140b. In certain embodiments, request 305 contains both login credentials and an authentication string, submitted by a first device 115a of user 110a. In some embodiments, security tool 105 receives a first request 305 from a first device 115a of user 110a that includes login credentials and also receives a second request 305 from a second device 115a of user 110a, different from the first device, that includes the authentication string.

In response to receiving the request(s) 305, security tool 105 launches a first virtual host 310. In step 510, security tool 105 uses first virtual host 310 to receive the authentication string. The authentication string includes a first part of a first key and indicates that user 110a previously accessed first subsystem 140a. The first key was previously generated by first subsystem 140a in response to user 110a accessing first subsystem 140a. In response to generating the first key, first subsystem 140a sent the first part of the first key to user 110a, sent the second part of the first key to first authentication server 145, and stored the full key in database 150.

In step 515, security tool 105 uses first virtual host 310 to send the authentication string to first authentication server 145, which extracts the first part of the first key from the authentication string. In step 520, first authentication server 145 assembles a test key that includes the first part of the first key and the second part of the first key, stored in first authentication server 145.

In step 525, first authentication server 145 determines whether the test key matches the first key stored in database 150 and sends a response to first virtual host 310 indicating whether the test key matches the first key stored in database 150. In step 530, first virtual host 310 uses the response to determine whether the first authentication server 145 authenticated user 110a, based on the first key. If, in step 530, first virtual host 310 determines that first authentication server 145 failed to authenticate user 110a based on the first key, then in step 535, first virtual host 310 denies connection request 160, and security tool 105 terminates first virtual host 310.

On the other hand, if, in step 530, first virtual host 310 determines that first authentication server 145 authenticated user 110a based on the first key, first virtual host 310 launches a second virtual host 325. In step 540, security tool 105 uses second virtual host 325 to provide user 110a's provided login credentials to second authentication server 155. In step 545, second virtual host 325 uses a response received from second authentication server 155 to determine whether second authentication server 155 authenticated user 110a for access to subsystem 140b. If, in step 545, second virtual host 325 determines that second authentication server 155 failed to authenticate user 110a for access to subsystem 140b, then in step 550, second virtual host 325 denies connection request 160, and security tool 105 terminates first virtual host 310 (thereby also terminating second virtual host 325).

On the other hand, if, in step 545, second virtual host 325 determines that second authentication server 155 did, in fact authenticate user 110a for access to subsystem 140b, then in step 555, second virtual host 325 provides user 110a with access to second subsystem 140b.

In response to user 110a accessing second subsystem 140b, in step 560, second subsystem 140b generates a second key associated with user 110a and indicating that user 110a has accessed second subsystem 140b. In step 565, second subsystem 140b stores the second key in database 150. In step 570, second subsystem 140b sends a first part of the second key to user 110a, for storage in the user's authentication string, stored on a device 115a of user 110a. Finally, in step 575, second subsystem 140b stores a second part of the second key in first authentication server 145.

Modifications, additions, or omissions may be made to method 500 depicted in FIG. 5. Method 500 may include more, fewer, or other steps. For example, steps may be performed in parallel or in any suitable order. While discussed as security tool 105 (or components thereof) performing the steps, any suitable component of system 100, such as device(s) 115 for example, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as falling within the scope of the appended claims.

What is claimed is:

1. A system comprising:
a database configured to store a first key associated with a first user, the first key comprising a first part of the first key and a second part of the first key, the first key generated by a first subsystem in response to the first user accessing the first subsystem, wherein the first part of the first key is further stored in an authentication string stored in a first device of the first user and the second part of the first key is further stored in a first authentication server;
a hardware processor configured to:
receive a first request indicating that the first user is seeking to access a second subsystem, wherein the first user previously accessed the first subsystem;
launch a first virtual host configured to:
perform a first authentication of the first user, without yet connecting the first user to the second subsystem, wherein performing the first authentication comprises:
receiving the authentication string from the first user, the authentication string comprising the first part of the first key and indicating that the first user previously accessed the first subsystem;
sending the authentication string to the first authentication server, the first authentication server storing the second part of the first key, the first authentication server configured to:
extract the first part of the first key from the authentication string;
assemble a test key comprising the first part of the first key and the second part of the first key; and
determine that the test key matches the first key stored in the database; and
receiving a first response from the first authentication server, the first response indicating that the first authentication server has authenticated the first user; and
in response to receiving the first response, launch a second virtual host configured to:
perform a second authentication of the first user, without yet connecting the first user to the second system, wherein performing the second authentication comprises:
receiving login credentials from the first user;
sending the login credentials to a second authentication server, the second authentication server configured to authenticate the first user and determine that the first user to authorized to access the second subsystem, based on the login credentials; and
receiving a second response from the second authentication server, the second response indicating that the second authentication server has authenticated the first user based on the login credentials; and
in response to receiving the second response, provide the first user with access to the second subsystem.

2. The system of claim 1, wherein the hardware processor is further configured to:
receive a second request indicating that a second user is seeking to access the second subsystem, the second user attempting to use the login credentials of the first user to access the second subsystem;

in response to receiving the second request, launch a third virtual host configured to:
  receive the login credentials and a second authentication string from the second user, without yet connecting the second user to the second subsystem;
  send the second authentication string to the first authentication server, the first authentication server further configured to determine that the second authentication string does not comprise the first part of the first key;
  receive a third response from the first authentication server, the third response indicating that the first authentication server failed to authenticate the second user, based on the second authentication string; and
  in response to receiving the third response, deny the second request; and
in response to the third virtual host denying the second request, terminate the third virtual host.

3. The system of claim 1, wherein the login credentials comprise a username and a password.

4. The system of claim 1, wherein the first request is received from a second device different from the first device.

5. The system of claim 1, wherein the database comprises a blockchain.

6. The system of claim 1, wherein the second subsystem is further configured to store a third part of the first key in a third subsystem, wherein the test key assembled by the first authentication server further comprises the third part of the first key.

7. The system of claim 1, wherein the first key indicates a number of times that the first user has accessed the first subsystem.

8. A method comprising:
  receiving a first request indicating that a first user is seeking to access a second subsystem, wherein the first user previously accessed a first subsystem;
  performing, using a first virtual host, a first authentication of the first user, without yet connecting the first user to the second system, wherein performing the first authentication comprises:
    receiving an authentication string from the first user, the authentication string stored in a first device of the first user, the authentication string comprising a first part of a first key, the first key stored in a database and comprising the first part of the first key and a second part of the first key, the first key generated by the first subsystem in response to the first user accessing the first subsystem;
    sending the authentication string to a first authentication server, the first authentication server storing the second part of the first key, the first authentication server configured to:
      extract the first part of the first key from the authentication string;
      assemble a test key comprising the first part of the first key and the second part of the first key; and
      determine that the test key matches the first key stored in the database; and
    receiving a first response from the first authentication server, the first response indicating that the first authentication server has authenticated the first user; and
  in response to receiving the first response, performing, using a second virtual host, a second authentication of the first user, without yet connecting the first user to the second subsystem, wherein performing the second authentication comprises:
    receiving login credentials from the first user;
    sending the login credentials to a second authentication server, the second authentication server configured to authenticate the first user and determine that the first user is authorized to access the second subsystem, based on the login credentials; and
    receiving a second response from the second authentication server, the second response indicating that the second authentication server has authenticated the first user based on the login credentials; and
  in response to receiving the second response, providing, using the second virtual host, the first user with access to the second subsystem.

9. The method of claim 8, further comprising:
  receiving a second request indicating that a second user is seeking to access the second subsystem, the second user attempting to use the login credentials of the first user to access the second subsystem;
  in response to receiving the second request, receiving, using a third virtual host, the login credentials and a second authentication string from the second user, without yet connecting the second user to the second subsystem;
  sending, using the third virtual host, the second authentication string to the first authentication server, the first authentication server further configured to determine that the second authentication string does not comprise the first part of the first key;
  receiving, using the third virtual host, a third response from the first authentication server, the third response indicating that the first authentication server failed to authenticate the second user, based on the second authentication string;
  in response to receiving the third response, denying, using the third virtual host, the second request; and
  in response to denying the second request, terminating the third virtual host.

10. The method of claim 8, wherein the login credentials comprise a username and a password.

11. The method of claim 8, wherein the authentication string is received from a second device different from the first device.

12. The method of claim 8, wherein the database comprises a blockchain.

13. The method of claim 8, wherein:
  the first key further comprises a third part of the first key, the third part of the first key stored in a third subsystem; and
  the test key assembled by the first authentication server further comprises the third part of the first key.

14. The method of claim 8, wherein the first key indicates a number of times that the first user has accessed the first subsystem.

15. A system comprising:
  a memory operable to store a first key associated with a first user, the first key comprising a first part of the first key and a second part of the first key, the first key generated by a first subsystem in response to the first user accessing the first subsystem, wherein the first part of the first key is further stored in an authentication string stored in a first device of the first user and the second part of the first key is further stored in a first authentication server;
  a hardware processor operable to:

receive a first request indicating that the first user is seeking to access a second subsystem, wherein the first user previously accessed the first subsystem;

launch a first virtual host operable to:
 perform a first authentication of the first user, without yet connecting the first user to the second system, wherein performing the first authentication comprises:
  receiving the authentication string from the first user, the authentication string comprising the first part of the first key and indicating that the first user previously accessed the first subsystem;
  sending the authentication string to the first authentication server, the first authentication server storing the second part of the first key, the first authentication server operable to:
   extract the first part of the first key from the authentication string;
   assemble a test key comprising the first part of the first key and the second part of the first key; and
   determine that the test key matches the first key stored in the storage element; and
  receiving a first response from the first authentication server,
 the first response indicating that the first authentication server has authenticated the first user; and
 in response to receiving the first response, launch a second virtual host operable to:
  perform a second authentication of the first user, without yet connecting the first user to the second system, wherein performing the second authentication comprises:
   receiving login credentials from the first user, the login credentials comprising a username and a password;
   sending the login credentials to a second authentication server, the second authentication server operable to authenticate the first user and determine that the first user to authorized to access the second subsystem, based on the login credentials; and
   receiving a second response from the second authentication server, the second response indicating that the second authentication server has authenticated the first user based on the login credentials; and
  in response to receiving the second response, provide the first user with access to the second subsystem.

16. The system of claim 15, wherein the hardware processor is further operable to:
 receive a second request indicating that a second user is seeking to access the second subsystem, the second user attempting to use the login credentials of the first user to access the second subsystem;
 in response to receiving the second request, launch a third virtual host operable to:
  receive the login credentials and a second authentication string from the second user, without yet connecting the second user to the second subsystem;
  send the second authentication string to the first authentication server, the first authentication server further operable to determine that the second authentication string does not comprise the first part of the first key;
  receive a third response from the first authentication server, the third response indicating that the first authentication server failed to authenticate the second user, based on the second authentication string; and
  in response to receiving the third response, deny the second request; and in response to the third virtual host denying the second request, terminate the third virtual host.

17. The system of claim 15, wherein the authentication string is received from a second device different from the first device.

18. The system of claim 15, wherein the first key is stored in a blockchain.

19. The system of claim 15, wherein the second subsystem is further operable to store a third part of the first key in a third subsystem, wherein the test key assembled by the first authentication server further comprises the third part of the first key.

20. The system of claim 15, wherein the first key indicates a number of times that the first user has accessed the first subsystem.

* * * * *